United States Patent
Goldman-Shenhar

(10) Patent No.: US 8,738,224 B2
(45) Date of Patent: May 27, 2014

(54) STEERING WHEEL SYSTEM

(75) Inventor: Claudia V. Goldman-Shenhar, Mevasseret Zion (IL)

(73) Assignee: GM Global Technology Operations LLC, Detroit, MI (US)

( * ) Notice: Subject to any disclaimer, the term of this patent is extended or adjusted under 35 U.S.C. 154(b) by 218 days.

(21) Appl. No.: 13/005,267

(22) Filed: Jan. 12, 2011

(65) Prior Publication Data
US 2012/0179328 A1 Jul. 12, 2012

(51) Int. Cl.
*G06F 7/00* (2006.01)
(52) U.S. Cl.
USPC .......................................................... 701/36
(58) Field of Classification Search
USPC .......................................................... 701/36
See application file for complete search history.

(56) References Cited

U.S. PATENT DOCUMENTS

| | | | |
|---|---|---|---|
| 1,608,549 A | 11/1926 | Dean, Jr. | |
| 3,771,096 A | 11/1973 | Walter | |
| 4,518,836 A | 5/1985 | Wooldridge | |
| 4,616,224 A | 10/1986 | Reighard | |
| 4,628,310 A | 12/1986 | Reighard et al. | |
| 5,808,374 A | 9/1998 | Miller et al. | |
| 5,855,144 A | 1/1999 | Parada | |
| 6,253,131 B1 | 6/2001 | Quigley et al. | |
| 6,256,558 B1 | 7/2001 | Sugiura et al. | |
| 6,300,939 B1 | 10/2001 | Decker et al. | |
| 6,418,362 B1 | 7/2002 | St. Pierre et al. | |
| 6,525,283 B2 | 2/2003 | Leng | |
| 6,626,062 B1 | 9/2003 | Yoshitake et al. | |
| 6,819,990 B2 | 11/2004 | Ichinose | |
| 6,852,936 B2 | 2/2005 | Hayashi et al. | |
| 6,871,720 B2 | 3/2005 | Hauer et al. | |
| 7,139,653 B2 | 11/2006 | Ringger et al. | |
| 7,217,894 B2 | 5/2007 | Miyako et al. | |
| 7,295,904 B2 | 11/2007 | Kanevsky et al. | |

(Continued)

FOREIGN PATENT DOCUMENTS

| | | |
|---|---|---|
| CN | 101367401 A | 2/2009 |
| DE | 10212781 A1 | 10/2003 |

(Continued)

OTHER PUBLICATIONS

State Intellectual Property Office of the Peoples' Republic of China, Office Action in Chinese Patent Application No. 201210008406.5, mailed Jan. 6, 2014.

*Primary Examiner* — Khoi Tran
*Assistant Examiner* — Harry Oh
(74) *Attorney, Agent, or Firm* — Ingrassia Fisher & Lorenz, P.C.

(57) ABSTRACT

A steering wheel system for use with a vehicle includes, but is not limited to, a steering wheel having a rim. A touch sensitive member covers the rim. The touch sensitive member detects first and second gestures on the rim and generates a first electronic signal when the first gesture is detected and generates a second electronic signal when the second gesture is detected. A processor is communicatively coupled to the touch sensitive member and is configured to be operatively coupled to a first subsystem and a second subsystem. The touch sensitive member is further configured to send the first electronic signal and the second electronic signal to the processor and the processor is further configured to send a first command to the first subsystem after receiving the first electronic signal and to send a second command to the second subsystem after receiving the second electronic signal.

19 Claims, 11 Drawing Sheets

(56) References Cited

U.S. PATENT DOCUMENTS

| | | |
|---|---|---|
| 7,441,800 B2 | 10/2008 | Weber et al. |
| 2003/0023353 A1 | 1/2003 | Badarneh |
| 2003/0111278 A1* | 6/2003 | Hauer et al. ............. 180/6.28 |
| 2005/0167252 A1 | 8/2005 | Inoue et al. |
| 2006/0044129 A1 | 3/2006 | Patel |
| 2006/0047386 A1* | 3/2006 | Kanevsky et al. ............ 701/36 |
| 2006/0070795 A1 | 4/2006 | Meissner |
| 2006/0227065 A1 | 10/2006 | Yukawa et al. |
| 2006/0227066 A1 | 10/2006 | Hu et al. |
| 2007/0062753 A1 | 3/2007 | Yoshida et al. |
| 2007/0100523 A1* | 5/2007 | Trachte ............ 701/41 |
| 2007/0120830 A1 | 5/2007 | Kammerer |
| 2008/0001931 A1 | 1/2008 | Szczerba et al. |
| 2008/0109132 A1 | 5/2008 | Yukawa et al. |
| 2009/0164062 A1* | 6/2009 | Aoki et al. ............ 701/36 |
| 2010/0030429 A1* | 2/2010 | Kuramori ............ 701/42 |
| 2011/0018832 A1* | 1/2011 | Pryor ............ 345/173 |
| 2011/0035100 A1* | 2/2011 | Sanma et al. ............ 701/36 |

FOREIGN PATENT DOCUMENTS

| | | |
|---|---|---|
| DE | 102006053499 A1 | 8/2008 |
| DE | 102007017509 A1 | 10/2008 |
| JP | 2006347215 A | 12/2006 |
| JP | 2009248629 A | 10/2009 |
| JP | 2009248777 A | 10/2009 |
| KR | 100667453 B1 | 1/2007 |
| WO | 2005096131 A2 | 10/2005 |

* cited by examiner

STEERING WHEEL SYSTEM

TECHNICAL FIELD

The technical field generally relates to a vehicle, and more particularly relates to a steering wheel system for use with the vehicle.

BACKGROUND

Modern vehicles include a plethora of electrical systems and components that a driver is called upon to operate and interact with while operating the vehicle. For example, some modern vehicles include some or all of the following systems: a stereo system, a compact disc player, a compact video disc player, a navigation system, a hands-free cellular communication system, a satellite radio system, a heating, ventilation, and air conditioning system, a windshield wiper system, a headlight system, a turn signal system, power actuated seats and mirrors, a cruise control system, and so on. Each of these systems/components is typically operated via a switch or some other type of manually manipulated actuator.

The demands of operating a vehicle, including the need to remain alert to, and aware of traffic and road conditions, make it undesirable for drivers to take their eyes off of the road and/or their hands off of the steering wheel. However, when drivers wish to operate or actuate one or more of the above referenced electronic systems while operating a vehicle, they may need to momentarily take their eyes off of the road and their hands off of the steering wheel.

One existing solution has been to mount redundant controllers/actuators for the various electronic systems and components to the central hub of the steering wheel. Other existing solutions have entailed the mounting of buttons and switches to the rim of the steering wheel itself. While these solutions have been adequate, there is room for improvement. For example, solutions that entail the positioning of controllers/actuators on the central hub of the steering wheel have not obviated the need for the driver to take a hand off of the rim of the steering wheel or their eyes momentarily off of the road. Solutions that entail the positioning of buttons and switches on the rim of the steering wheel do obviate the need for the driver to remove a hand from the rim of the steering wheel. However, by placing buttons and switches on the rim, the controlled system(s) may be unintentionally actuated as the driver turns the steering wheel to steer the vehicle.

SUMMARY

Various embodiments of a steering wheel system for use with the vehicle are disclosed herein.

In a non-limiting embodiment, the steering wheel system includes, but is not limited to, a steering wheel that is configured for attachment to a steering column of a vehicle. The steering wheel has a rim. The steering wheel system further includes a touch sensitive member associated with the rim. The touch sensitive member is configured to detect a first gesture on the rim and a second gesture on the rim and to generate a first electronic signal when the first gesture is detected and to generate a second electronic signal when the second gesture is detected. The steering wheel system further includes a processor that is communicatively coupled to the touch sensitive member. The processor is configured to be operatively coupled to a first subsystem and to a second subsystem. The touch sensitive member is further configured to send the first electronic signal and the second electronic signal to the processor. The processor is further configured to send a first command to the first subsystem after receiving the first electronic signal and to send a second command to the second subsystem after receiving the second electronic signal.

In another non-limiting embodiment, the steering wheel system includes, but is not limited to, a steering wheel that is configured for attachment to a steering column of a vehicle. The steering wheel has a rim. The steering wheel system further includes a touch sensitive member that is associated with the rim. The touch sensitive member is configured to detect a first gesture on the rim and a second gesture on the rim and to generate a first electronic signal when the first gesture is detected and to generate a second electronic signal when the second gesture is detected. The steering wheel system further includes a steering wheel sensor that is associated with the steering wheel. The steering wheel sensor is configured to detect rotation of the steering wheel and is further configured to generate a third electronic signal corresponding to the rotation of the steering wheel. The steering wheel system still further includes a processor that is communicatively coupled to the touch sensitive member and to the steering wheel sensor. The processor is configured to be operatively coupled to a first subsystem and to a second subsystem. The touch sensitive member is further configured to send the first electronic signal and the second electronic signal to the processor. The steering wheel sensor is configured to send the third electronic signal to the processor. The processor is configured to send a first command to the first subsystem after receiving the first electronic signal when the first gesture is detected proximate a predetermined location on the rim relative to a driver of the vehicle. The processor is further configured to send a second command to the second subsystem after receiving the second electronic signal when the second gesture is detected proximate the predetermined location.

In another non-limiting embodiment, the steering wheel system includes, but is not limited to, a steering wheel that is configured for attachment to a steering column of a vehicle. The steering wheel has a rim. The steering wheel system further includes a touch sensitive member that is associated with the rim. The touch sensitive member is configured to detect a first gesture on the rim and a second gesture on the rim and to generate a first electronic signal when the first gesture is detected and to generate a second electronic signal when the second gesture is detected. The steering wheel system further includes a subsystem-selector switch that is associated with the steering wheel. The steering wheel system still further includes a processor that is communicatively coupled to the touch sensitive member and the subsystem-selector switch. The processor is configured to be operatively coupled to a first subsystem, to a second subsystem, to a third subsystem, and to a fourth subsystem. The touch sensitive member is further configured to send the first electronic signal and the second electronic signal to the processor. The subsystem-selector switch is configured to alternate between a first operating mode and a second operating mode. The processor is configured to control the first subsystem and the second subsystem when the subsystem-selector switch is in the first operating mode. The processor is configured to control the third subsystem and the fourth subsystem when the subsystem-selector is in the second operating mode. The processor is further configured to send a first command to the first subsystem after receiving the first electronic signal when the subsystem-selector switch is in the first operating mode and to send a second command to the second subsystem after receiving the second electronic signal room the subsystem-selector switch is in the first operating mode. The processor is still further configured to send a third command to the third subsystem after receiving the first electronic signal when the subsystem-selector switch is in the second operating mode and to send a fourth command to the fourth subsystem after receiving the second electronic signal when the subsystem-selector switch is in the second operating mode.

DESCRIPTION OF THE DRAWINGS

One or more embodiments will hereinafter be described in conjunction with the following drawing figures, wherein like numerals denote like elements.

DETAILED DESCRIPTION

Figure 1:
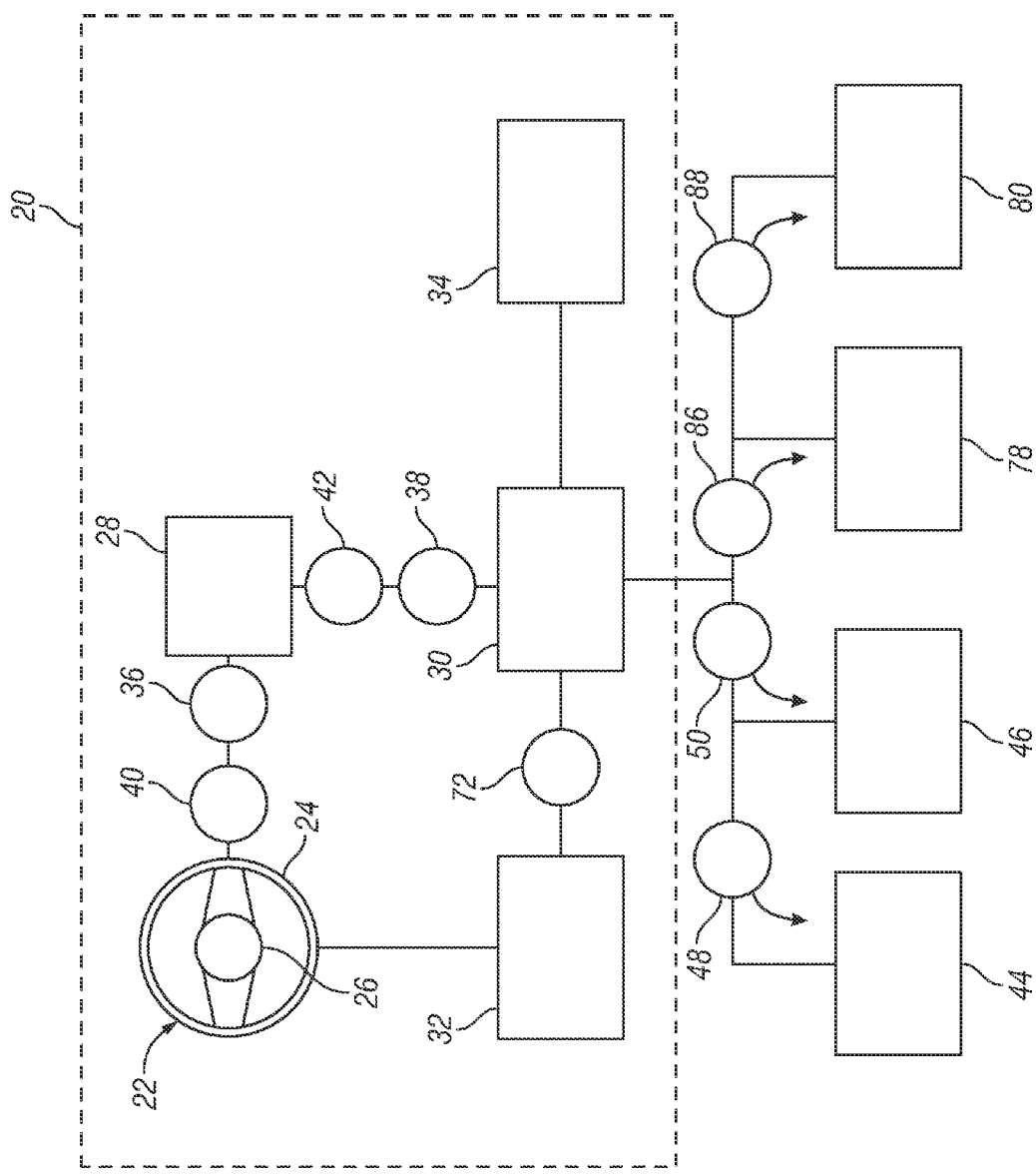
FIG. 1 is a schematic view illustrating an embodiment of a steering wheel system for use with a vehicle made in accordance with the teachings disclosed herein.

The following detailed description is merely exemplary in nature and is not intended to limit application and uses. Furthermore, there is no intention to be bound by any expressed or implied theory presented in the preceding technical field, background, brief summary or the following detailed description.

An improved steering wheel system for use with a vehicle is disclosed herein. A touch sensitive member is wrapped around the rim (or a portion thereof) of a steering wheel, thereby transforming the rim into a convex touch sensitive actuator. The touch sensitive member may be a thin film material such as that which is currently used in conventional touch screen display systems to detect a person's touch on a display screen. The touch sensitive member is configured to generate electronic signals that correspond with different gestures made by a driver on the steering wheel. As used herein, the term "gesture" refers to the deliberate movement of a person's finger(s) or other body part or appendage(s) along a surface of the touch sensitive member in a predetermined pattern or manner. For example, fingers swept across the surface of the touch sensitive member in an arc would cause the touch sensitive member to generate a first electronic signal. Figures grasping the steering wheel and rotating/twisting in a clockwise or counterclockwise direction around a section of the rim would cause the touch sensitive member to generate a second electronic signal. Additional gestures could also be detected by the touch sensitive member and would result in the generation of additional electronic signals by the touch sensitive member. The touch sensitive member is operatively connected to a processor and is configured to send the electronic signal(s) to the processor when each gesture is detected.

The processor is operatively connected to multiple subsystems onboard the vehicle. For example, the processor may be operatively connected to the vehicle's windshield wiper system and the vehicle's turn signal system. The processor is configured to transmit control commands to the multiple subsystems. For instance, the processor may transmit a first command to the windshield wiper system to turn the windshield wipers on or off and may transmit a second command to the turn signal system to turn a blinker on or off. The commands sent by the processor to the various subsystems depend upon which electronic signal the processor receives from the touch sensitive member. Accordingly, the processor is configured to receive the electronic signals from the touch sensitive member, to discern which electronic signal has been sent, and to send instructions to a subsystem on board the vehicle that corresponds with the electronic signal. In some embodiments, random movements of the driver's hand or portions thereof along the surface of the touch sensitive member that do not conform to a predetermined pattern (and which are therefore not gestures) would not result in the generation of an electronic signal. In other embodiments, any movement detected on the surface of the touch sensitive member would result in the generation of an electronic signal that would, in turn, be transmitted to the processor. In such embodiments, responsibility for discerning gestures from random movements of a hand or a finger along a surface of the steering wheel would be delegated to the processor.

The steering wheel system described above enables the driver to operate the various subsystems onboard vehicle simply by making specific gestures on the surface of the steering wheel. The steering wheel acts as a human machine interface that permits the driver of the vehicle to operate multiple subsystems using a single actuator (i.e., the steering wheel). Use of this system allows the driver to interact with the multiple subsystems onboard the vehicle while driving without having to take the driver's eyes off of the road or a hand off of the steering wheel. Furthermore, the use of this steering wheel system can be made intuitive by designing the gestures so that they simulate or mimic the types of motions that are typically used to actuate the conventional switches that are associated with the controlled subsystems. For example, the rotation of a knob may be simulated by twisting fingers around the rim of the steering wheel.

A further understanding of the steering wheel system described above may be obtained through a review of the illustrations accompanying this application together with a review of the detailed description that follows.

FIG. 1 is a schematic view illustrating an embodiment of a steering wheel system 20 for use with a vehicle (vehicle not shown) made in accordance with the teachings disclosed herein. Steering wheel system 20 includes a steering wheel 22 having a rim 24 and a central hub 26. Steering wheel system 20 is configured for attachment to a steering column of the vehicle and may be attached thereto in any conventional manner. Steering wheel system 20 further includes a touch sensitive member 28, and a processor 30. In some embodiments of steering wheel system 20, such as the embodiment shown in FIG. 1, steering wheel system 20 further includes a steering wheel sensor 32 and/or a subsystem selector switch 34. In still other embodiments, steering wheel system 20 may include additional components not listed above without departing from the teachings herein.

Touch sensitive member 28 is configured to detect gestures made by a person on a surface of touch sensitive member 28. In some embodiments, touch sensitive member 28 is configured to convert each gesture detected into an electronic signal. For example, the sliding of a single finger in an arc-like pattern over a surface of touch sensitive member 28 may cause touch sensitive member 28 to generate a first electronic signal. The rotation of a single finger around a segment of rim 24 may cause touch sensitive member 28 to generate a second electronic signal. The sliding of two fingers in unison over surface of touch sensitive member 28 in an arc-like pattern may cause touch sensitive member 28 to generate a third electronic signal. The rotation of two fingers in unison around a segment of rim 24 may cause touch sensitive member 28 to generate a fourth electronic signal, and so on. A large number of variations and permutations of gestures are possible. In some embodiments, a single gesture detected by touch sensitive member 28 at any location on rim 24 will result in the generation of the same electronic signal. In other embodiments, a single gesture may result in the generation of multiple distinct electronic signals when that single gesture is made at different locations on rim 24.

Touch sensitive member 28 may be any suitable, flexible, touch sensitive component that is configured to detect the movement of a person's finger (or other appendage) on and/or along a surface of touch sensitive member 28. Multiple technologies exist for detecting a person's touch including those disclosed in U.S. Pat. Nos. 4,521,870; 4,821,031; 5,038,142; 5,956,021; 6,259,491; 6,297,811; and 6,492,979, the disclosures of which are hereby incorporated herein in their entirety by reference. Touch sensitive member 28 may comprise any suitable material including rubber, plastic, foil, and/or any other relatively thin flexible material capable of housing touch sensitive technology. Touch sensitive member 28 may be contoured and configured to be wrapped around rim 24 such that touch sensitive member 28 covers at least a portion of rim 24. In some embodiments, touch sensitive member 28 may be positioned to cover only a portion of rim 24. For example, touch sensitive member 28 may be positioned to cover only a portion of rim 24 that faces a driver of the vehicle. In another example, touch sensitive member 28 may be positioned to cover only a portion of rim 24 that faces away from the driver and towards and instrument panel of the vehicle. In other embodiments, touch sensitive member 28 may be contoured and configured to cover substantially the entire surface of rim 24. In still other embodiments, multiple individual touch sensitive members 28 may be employed to cover multiple discrete areas of rim 24 and thereby create multiple driver input zones along the surface of rim 24.

Processor 30 may be any type of computer, computer system, microprocessor, collection of logic devices, a state machine, or any other analog or digital circuitry that is configured to calculate, and/or to perform algorithms, and/or to execute software applications, and/or to execute sub-routines, and/or to be loaded with and to execute any type of computer program. Processor 30 may comprise a single processor or a plurality of processors acting in concert. In some embodiments, processor 30 may be dedicated for use exclusively with steering wheel system 20, while in other embodiments processor 30 may be shared with other systems onboard the vehicle. In still other embodiments, processor 30 may not be a separate component, but rather, may be integrated into any of the other components of steering wheel system 20. For example, in some embodiments, processor 30 may be a component of touch sensitive member 28, steering wheel sensor 32, and/or subsystem selector switch 34.

In the illustrated embodiment, processor 30 is operatively coupled to touch sensitive member 28, steering wheel sensor 32, and subsystem selector switch 34. Such operative couplings may be made through the use of any suitable means of transmission including both wired and wireless connections. For example, each component may be physically connected to processor 30 via a coaxial cable or via any other type of wire connection effective to convey electronic signals. In other embodiments, each component may be coupled to processor 30 across a bus or other similar communication corridor. Examples of suitable wireless connections include, but are not limited to, a wireless communication protocol identified by the Bluetooth trademark, a Wi-Fi connection, an infrared connection or the like.

Touch sensitive member 28 is configured to send to processor 30 the electronic signals that are generated by touch sensitive member 28 as a result of the gestures detected by touch sensitive member 28. For example, when a first gesture 36 is detected by touch sensitive member 28 on the surface of rim 24, touch sensitive member 28 will generate a first electronic signal 38 and send first electronic signal 38 to processor 30. When a second gesture 40 is detected by touch sensitive member 28 on the surface of rim 24, touch sensitive member 28 will generate a second electronic signal 42 and send the second electronic signal 42 to processor 30.

In the illustrated example, processor 30 is operatively coupled to first subsystem 44 and second subsystem 46. First subsystem 44 and second subsystem 46 may be any system associated with the vehicle. For example, first subsystem 44 may be the vehicle's stereo system and second subsystem 46 may be vehicles headlight system. Processor 30 is further configured to send commands to first and second subsystems 44 and 46 that actuate (e.g., turn on, turn off, and/or adjust) first and second subsystems 44, 46. Processor 30 is configured to send a first command 48 to first subsystem 44 when processor 30 receives first electronic signal 38 from touch sensitive member 28. Processor 30 is still further configured to send a second command 50 to second subsystem 46 when processor 30 receives second electronic signal 42 from touch sensitive member 28. Thus, the processor 30 is configured to discern the different electronic signals from one another and to send specific and distinct actuation commands to different subsystems based on the specific electronic signal that processor 30 receives. In this manner, by making a predetermined gesture on a surface of rim 24, a driver can actuate one of several subsystems onboard the vehicle.

Figure 2:
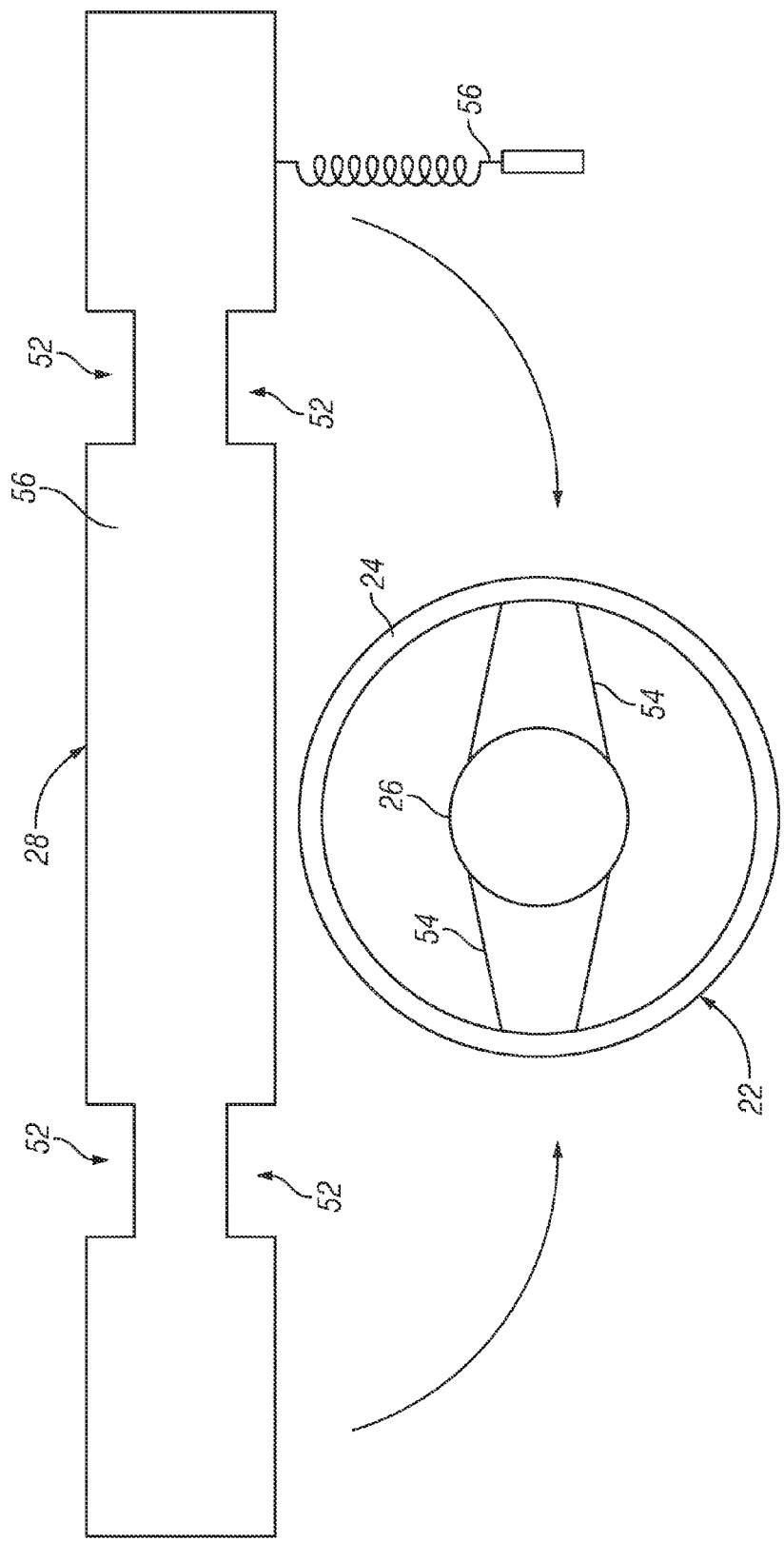
FIG. 2 illustrates a steering wheel and a touch sensitive member prior to assembly to the steering wheel.

FIG. 2 illustrates steering wheel 22 and touch sensitive member 28 prior to assembly to steering wheel 22. In the illustrated embodiment, touch sensitive member 28 is a thin film material that has the shape of an elongated rectangle with a plurality of cutouts 52. Cutouts 52 are positioned longitudinally along a length of touch sensitive member 28 at positions that will correspond with support members 54 when touch sensitive member 28 is wrapped around rim 24. The location and dimensions of cutouts 52 will vary with the size, shape and configuration of steering wheel 22. Support members 54 are configured to support rim 24 on central hub 26. The presence of support members 54 obstructs portions of touch sensitive member 28 from wrapping completely around rim 24. Cutouts 52 are therefore provided to accommodate the presence of support members 54. In other embodiments, a greater or lesser number of support members 54 may be present and a corresponding number (and configuration) of cutouts 52 would be required.

With continuing reference to FIGS. 1-2, touch sensitive member 28 includes a main body portion 56 that houses the electronics needed to detect the touch of a finger (or other appendage) and to convert each detected touch into a corresponding electronic signal. The electronic signal is transmitted by touch sensitive member 28 to processor 30 via wire 56 which is configured to convey electronic signals. In some embodiments, the electronic signals may be transmitted wirelessly. In such embodiments, wire 56 may not be present.

Figure 3:
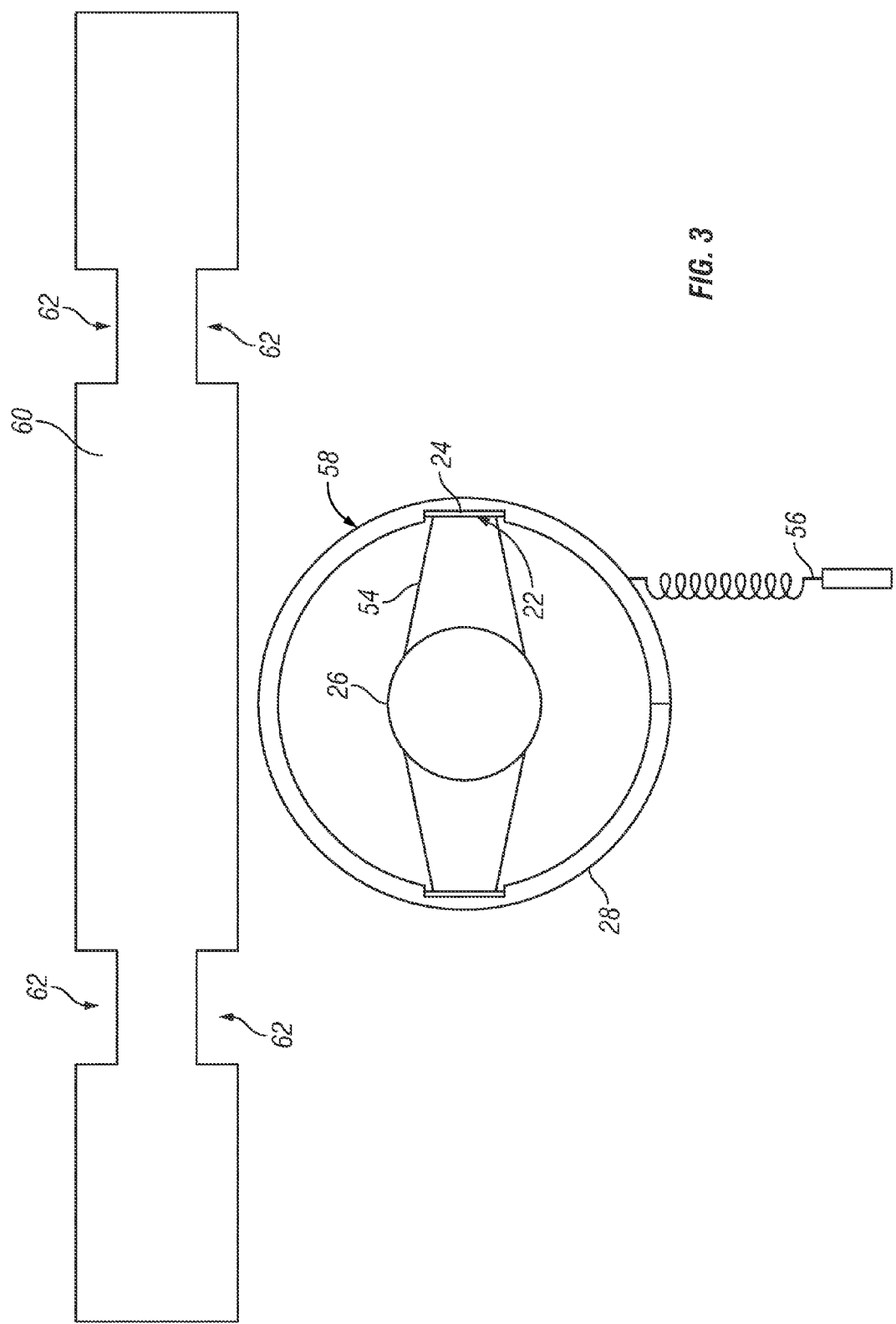
FIG. 3 illustrates a steering wheel assembly including the steering wheel and the touch sensitive member of FIG. 2 and a cover member prior to assembly over the touch sensitive member.

FIG. 3 illustrates an assembly 58 of the steering wheel 22 and touch sensitive member 28 as well as a cover member 60 prior to assembly of cover member 60 over touch sensitive member 28. Touch sensitive number 28 may be secured to steering wheel 22 via adhesive or mechanical fasteners. In some embodiments, such as the embodiment shown in FIG. 3, an outer cover (cover member 60) may be assembled over the assembly of steering wheel 22 and touch sensitive member 28. For example, it may be desirable to protect touch sensitive member 28 with a plastic or vinyl outer coating. In some examples, cover member 60 may comprise leather or suede to provide a more luxurious appointment. As illustrated, cover member 60 includes cut outs 62 to accommodate support members 54 and to allow cover member 60 be wrapped substantially completely around steering wheel 22. By providing cover member 60, touch sensitive member 28 in the driver is presented with a steering wheel that is not substantially different in appearance from other steering wheels.

Figure 4:
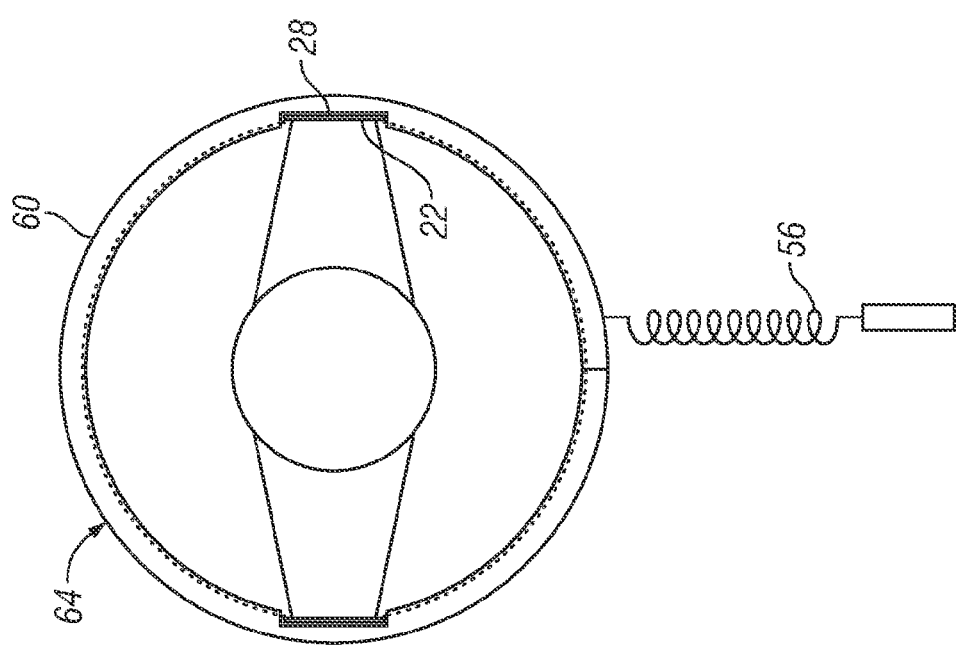
FIG. 4 illustrates an assembly of the steering wheel, the touch sensitive member, and the cover member of FIG. 3.

FIG. 4 illustrates a steering wheel assembly 64 comprising steering wheel 22, the touch sensitive member 28, and cover member 60. Once steering wheel assembly 64 has been assembled, it may be connected to a steering column of the vehicle. In some embodiments, wire 56 may be routed through the steering column for coupling to the processor.

Figure 5:
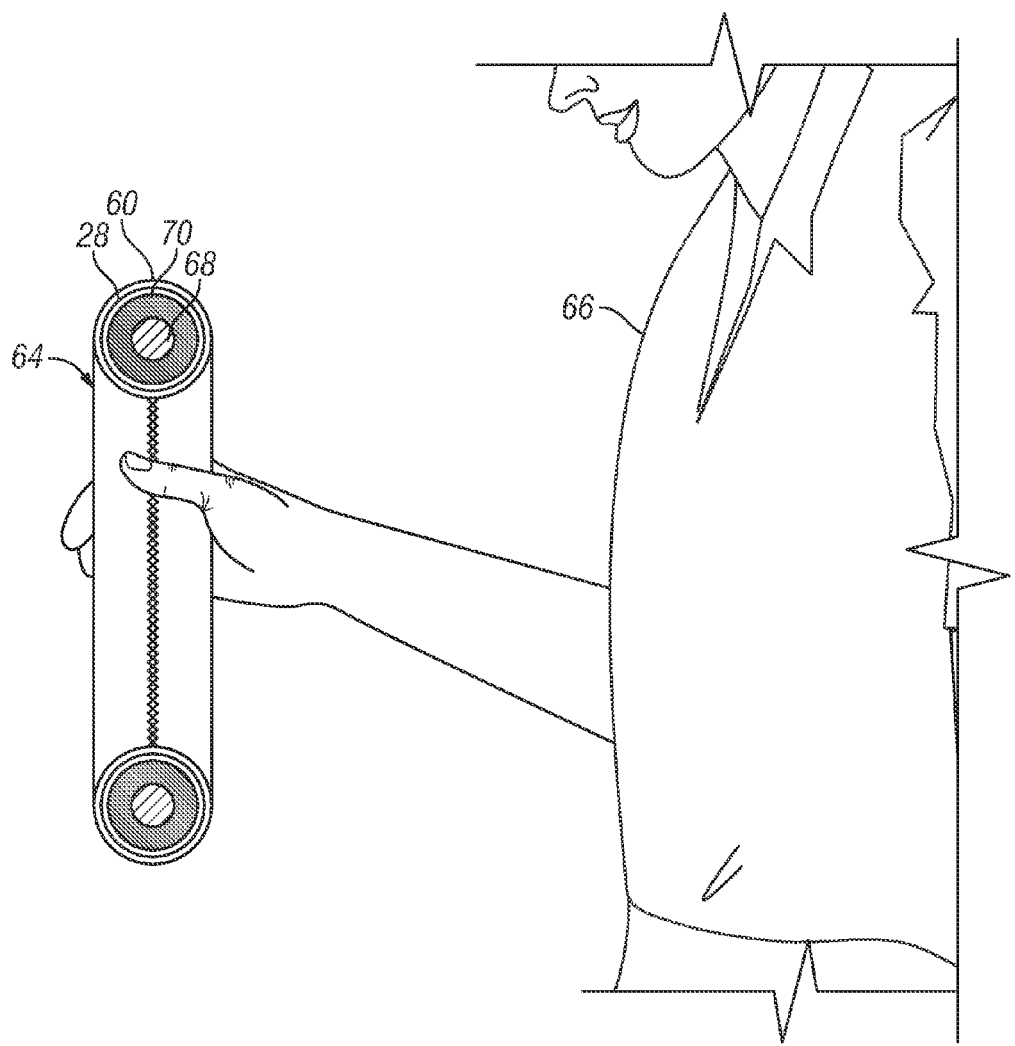
FIG. 5 illustrates a cross sectional view of the steering wheel assembly of FIG. 4 and further illustrates a typical arrangement with the driver situated in front of the steering wheel assembly of FIG. 4.

FIG. 5 illustrates a cross sectional view of steering wheel assembly 64 and further illustrates a driver 66 of the vehicle situated in front of steering wheel assembly 64. Steering wheel assembly 64 includes a central core 68 made of steel or some other structurally supportive material. Surrounding central core 68 is a layer of padding 70 which may comprise foam or any other suitable cushioning material. In some embodiments, layer of padding 70 may be omitted. Surrounding padding 70 is touch sensitive member 28. As illustrated, touch sensitive member 28 surrounds an entire periphery of padding 70 providing driver 66 with the opportunity to input gestures around an entire periphery of steering wheel assembly 64. Cover member 60 substantially surrounds and protects touch sensitive member 28.

Figure 6:
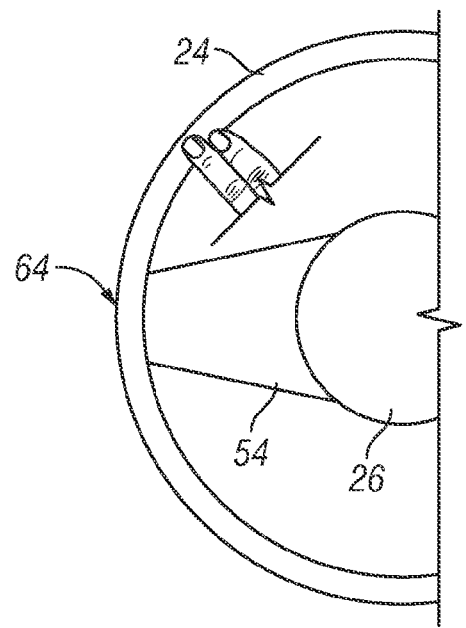
FIG. 6 is a fragmentary view of the steering wheel assembly of FIG. 4 with two fingers of the driver's hand resting on the steering wheel assembly prior to making a first gesture.
Figure 7:
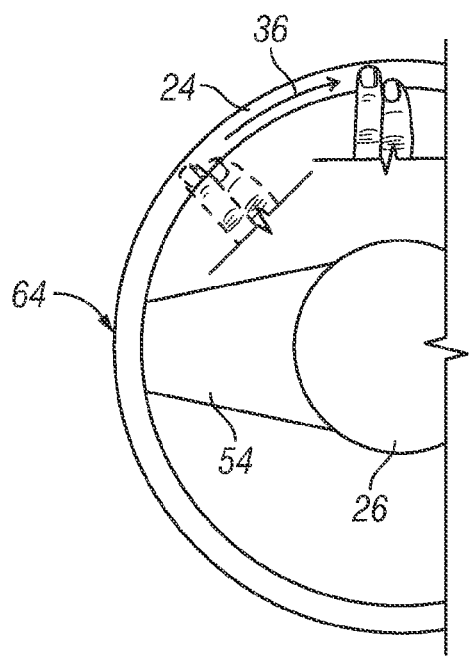
FIG. 7 is a fragmentary view of the steering wheel assembly of FIG. 6 illustrating the position of the two fingers of the driver's hand subsequent to making the first gesture.

FIG. 6 is a fragmentary view of steering wheel assembly 64. With continuing reference to FIGS. 1-6, FIG. 6 illustrates two fingers of the driver's hand resting on steering wheel assembly 64 prior to making first gesture 36. FIG. 7 is a fragmentary view of steering wheel assembly 64 similar to FIG. 6, illustrating the position of the two fingers of the driver's hand subsequent to making first gesture 36. In this illustrated embodiment, first gesture 36 comprises sliding the two fingers in a gentle arc to the right along the surface of rim 24. In some embodiments, first gesture 36 may be made by driver 66 at any location on rim 24 and will be recognized by processor 30 as being first gesture 36. This would allow driver 66 to actuate first subsystem 44 by making first gesture 36 at any desired location on rim 24. In other embodiments, steering wheel system 20 may be configured to detect first gesture 36 only on the portion of rim 24 that faces towards driver 66 or that faces away from driver 66. In still other embodiments, steering wheel system 20 may be configured to interpret first gesture 36 as an instruction to actuate first subsystem 44 only when first gesture 36 is detected at a predetermined location on rim 24 and to interpret first gesture 36 as an instruction actuate a different subsystem when first gesture 36 is detected at a different predetermined location on rim 24. Such a configuration would permit the use of the same gesture to actuate multiple subsystems simply by making the gesture in different parts of steering wheel 22.

Figure 8:
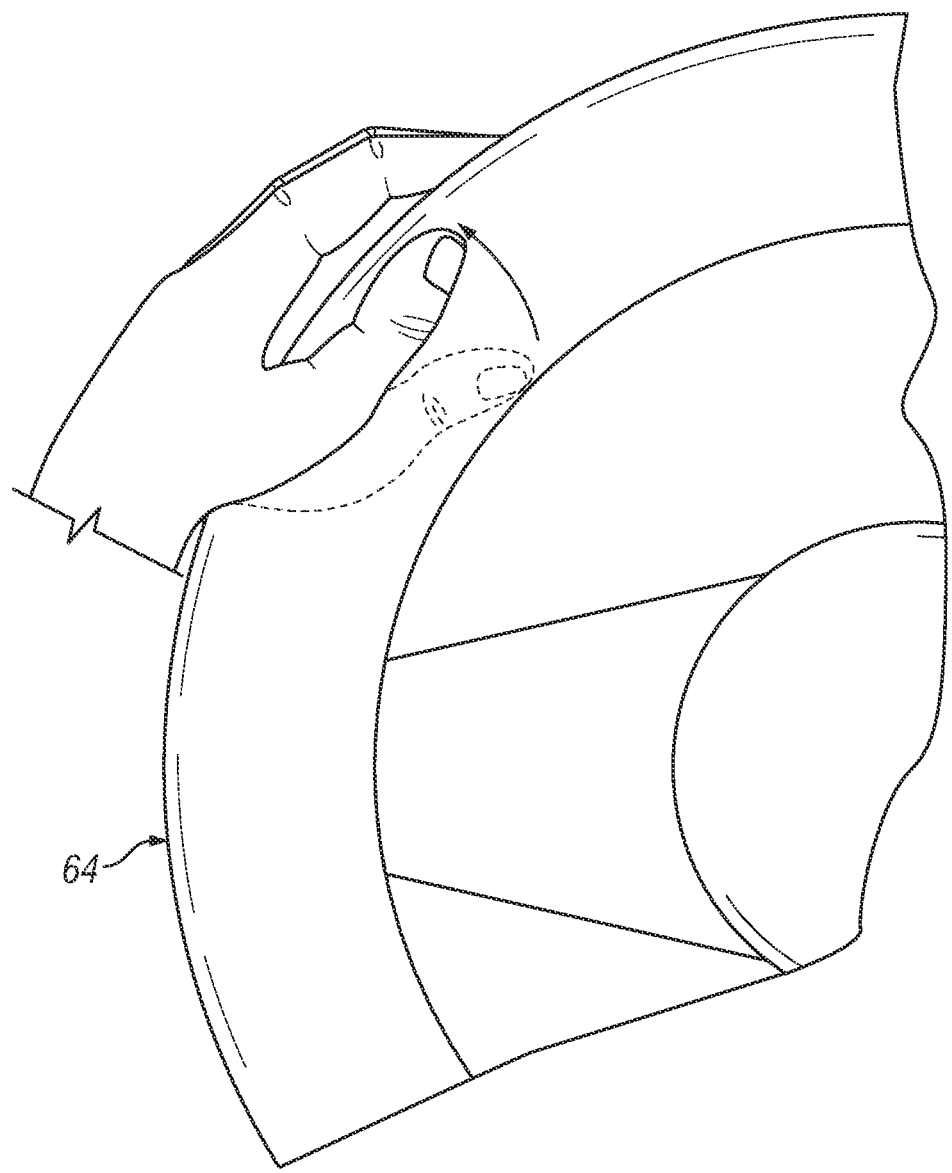
FIG. 8 is a fragmentary view of the steering wheel assembly of FIG. 6 illustrating a gesture made using the driver's thumb.

FIG. 8 is a fragmentary view of steering wheel assembly 64. With continuing reference to FIGS. 1-8, FIG. 8 illustrates that the driver can use their thumb to input first gesture 36 by gently sliding their thumb across a surface of rim 24. This enables the driver to provide inputs into steering wheel system 20 without moving their hand from its current location on steering wheel assembly 64. In some embodiments, such gestures may be made on any surface of rim 24 including those facing the driver and those facing away from the driver.

Figure 9:
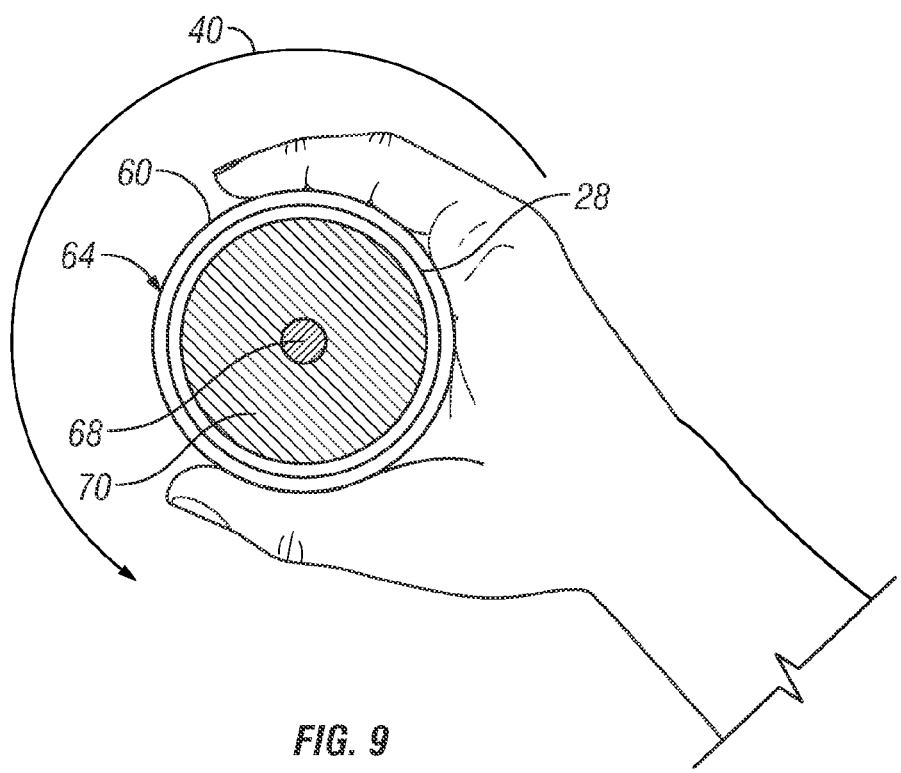
FIG. 9 is a cross sectional view of a portion of the steering wheel assembly of FIG. 4 with the driver's hand wrapped around the steering wheel assembly prior to making a second gesture.
Figure 10:
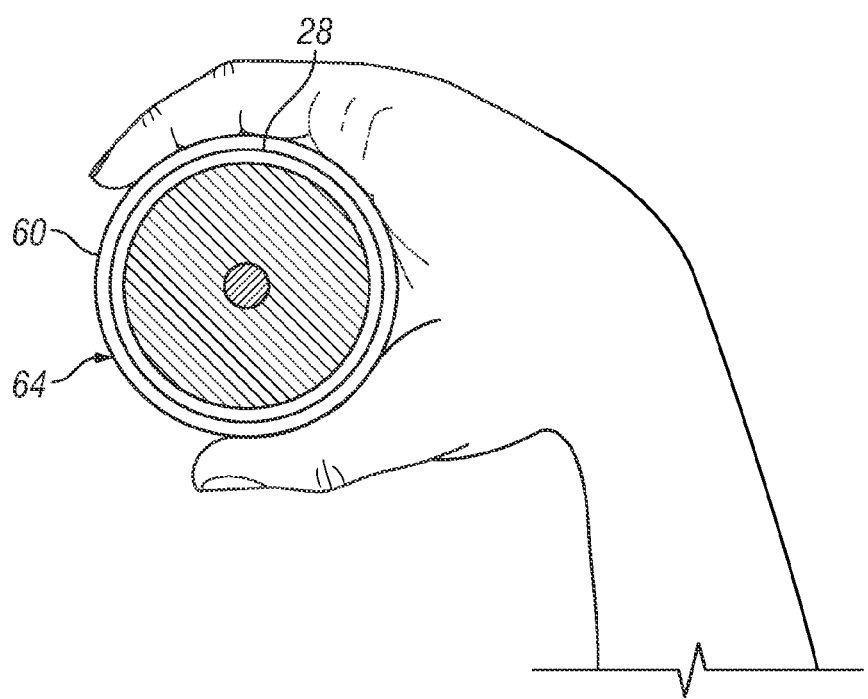
FIG. 10 is a cross sectional view of the steering wheel assembly of FIG. 9 with the driver's hand wrapped around the steering wheel assembly subsequent to making the second gesture.

FIG. 9 is a cross sectional view of a portion of steering wheel assembly 64 with a hand of driver 66 wrapped around the steering wheel assembly 64 prior to making second gesture 40. FIG. 10 is a cross sectional view of the portion of steering wheel assembly 64 of FIG. 9 with the hand of driver 66 wrapped around the steering wheel assembly subsequent to making the second gesture. With continuing reference to FIGS. 1-10, to make the second gesture, the driver has twisted his hand around rim 24 in a counter-clockwise direction as indicated by the arrow in FIG. 9. This twisting gesture will actuate second subsystem 46.

While FIGS. 6-10 depicted two different types of gestures that may be made by driver 66 on steering wheel assembly 64 and detected by steering wheel system 20, it should be understood that many other types of gestures may also be detectable by steering wheel system 20 and may be interpreted by steering wheel system 20 as an intent to actuate one or more subsystems of the vehicle.

With continuing reference to FIG. 1, steering wheel sensor 32 is configured to detect the angle of rotation of steering wheel 22 and to generate a third electronic signal 72 corresponding its rotation. In some embodiments, third electronic signal 72 may correspond with a deviation of steering wheel 22 from a neutral position (e.g., a position that corresponds with the vehicle's wheels being oriented for straight line driving). Steering wheel sensor 32 is further configured to send third electronic signal 72 to processor 30. In some embodiments, processor 30 may be configured to utilize third electronic signal 72 to determine the current angle of rotation of steering wheel 22. In such embodiments, processor 30 may be further configured to respond to gestures made on steering wheel 22 only when those gestures are detected at predetermined locations with respect to the driver. For example, steering wheel system 20 may be configured to respond to gestures only when those gestures are made on portions of steering wheel 22 that are located to the left side or to the right side of the driver, regardless of the angle of rotation of steering wheel 22. In this manner, a driver in need not associate a particular gesture with a specific portion of the steering wheel but rather need only remember whether the gesture needs to be input on the left or right side of the steering wheel. This arrangement may be particularly intuitive for a driver who is accustomed to actuating switches that are mounted to the vehicle's instrument panel in fixed positions and which remain in those fixed positions regardless of the steering wheel angle.

Figure 11:
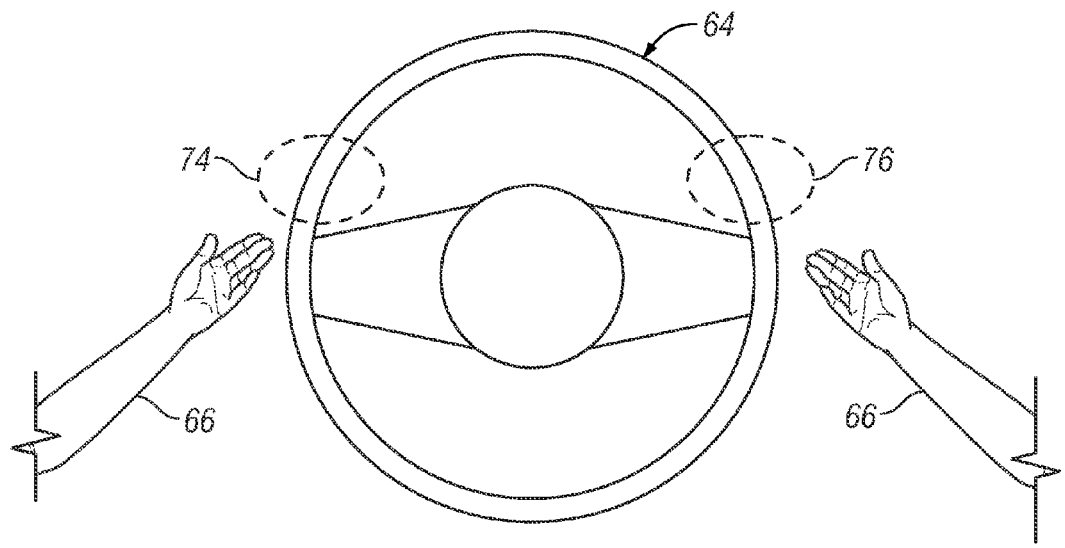
FIG. 11 is a view illustrating the steering wheel assembly of FIG. 4 and further illustrating two predetermined locations on the rim where the steering wheel system is configured to accept gestures by the driver.

FIG. 11 is a view illustrating steering wheel assembly 64 and further illustrating exemplary predetermined locations on the rim where the steering wheel system is configured to detect and accept gestures by the driver. Gestures that are input by the driver on the steering wheel outside of these predetermined locations will be rejected by steering wheel system 20 and will not result in the actuation of any vehicle subsystem. In the illustrated embodiment, a first predetermined location 74 is located at a left side of steering wheel assembly 64 and a second predetermined location 76 is located at a right side of steering wheel assembly 64. First and second predetermined locations 74 and 76 will remain at these relative locations with respect to driver 66 as driver 66 turns steering wheel assembly 64.

Figure 12:
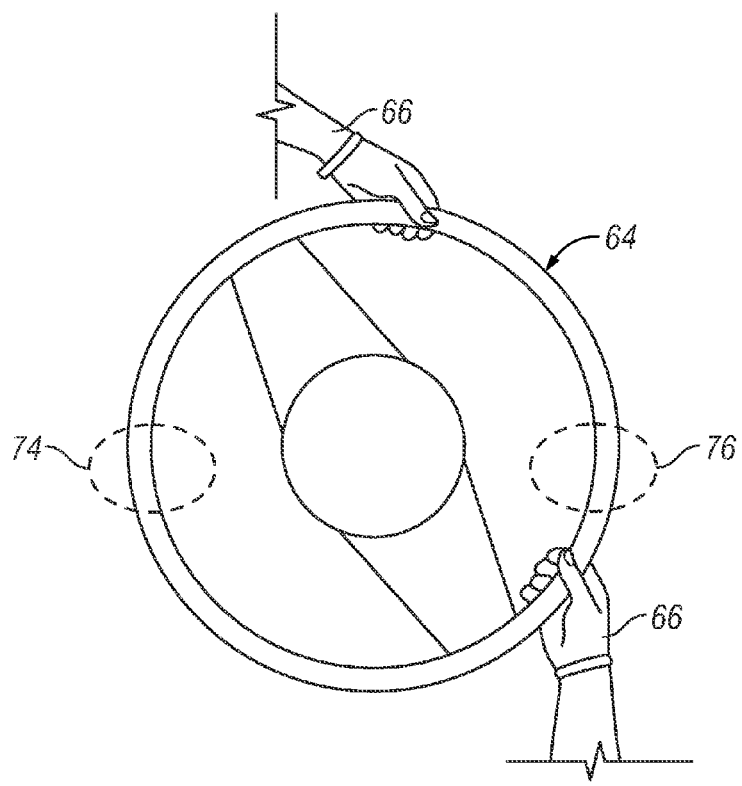
FIG. 12 is a view illustrating the steering wheel assembly of FIG. 10 during a turn and further illustrating that the two predetermined locations on the rim remain substantially constant with respect to the driver.

FIG. 12 is a view illustrating steering wheel assembly 64 as the driver turns the steering wheel to turn the vehicle and further illustrates that predetermined locations 74 and 76 remain substantially constant with respect to the driver. Keeping first and second predetermined locations 74 and 76 substantially constant with respect to driver 66 facilitates the ability of driver 66 to actuate subsystems on the vehicle while executing vehicle maneuvers. Using the strategy illustrated in FIGS. 10 and 11, driver 66 need only remember where the gesture need to be entered with respect to himself and need not memorize or locate a specific portion of steering wheel assembly 64 for the purposes of inputting the desired gesture.

With continuing reference to FIG. 1, subsystem selector switch 34 is configured to switch steering wheel system 20 between a plurality of operating modes. For example, subsystem selector switch 34 may be configured to switch steering wheel system 20 between a first operating mode and a second operating mode. While in these different operating modes, processor 30 will interpret the same gesture as intent by the driver to actuate different systems. For example, when subsystem selector switch 34 places steering wheel system 20 in the first operating mode, processor 30 will interpret first gesture 36 and second gesture 40 as an intent by the driver to actuate first subsystem 44 and second subsystem 46, respectively. However, when subsystem selector switch 34 places steering wheel system 20 in the second operating mode, processor 30 will interpret first gesture 36 and second gesture 40 as an intent by the driver to actuate a third subsystem 78 and a fourth subsystem 80, respectively.

Use of subsystem selector switch 34 diminishes the need of the driver to memorize an excessive number of discrete gestures and instead allows the driver to use the same gestures to actuate different vehicle subsystems. In some embodiments, subsystem selector switch 34 may be a simple switch, dial, knob, button, or any other suitable mechanical actuator. In other embodiments, subsystem selector switch 34 may comprise a touch screen display that can provide text or graphical readout for the driver that indicates which operating mode is activated.

Figure 13:
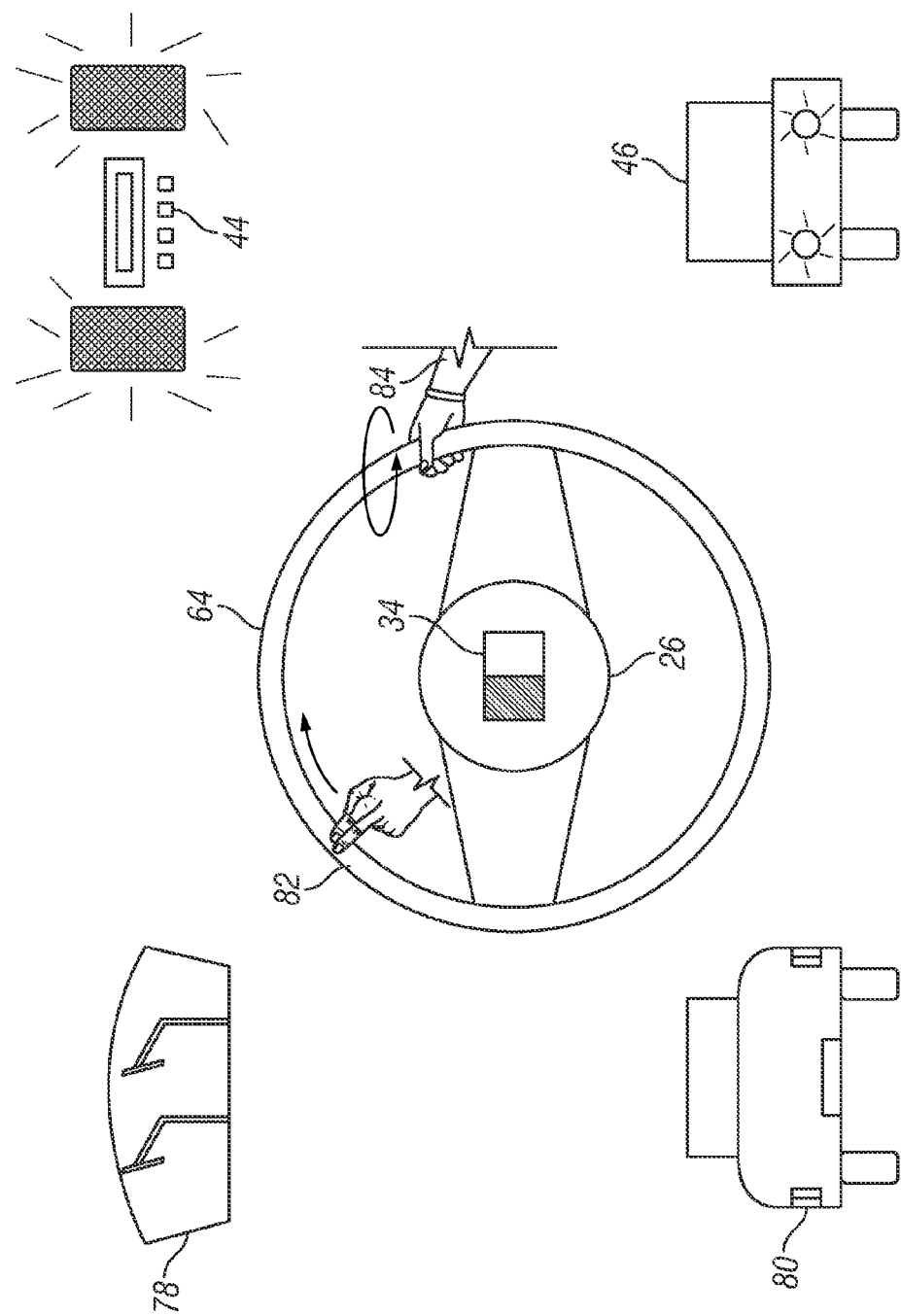
FIGS. 13-14 are schematic views illustrating an alternate embodiment of a steering wheel assembly that is configured to operate in multiple operating modes and that uses substantially identical gestures to control multiple subsystems.
Figure 14:
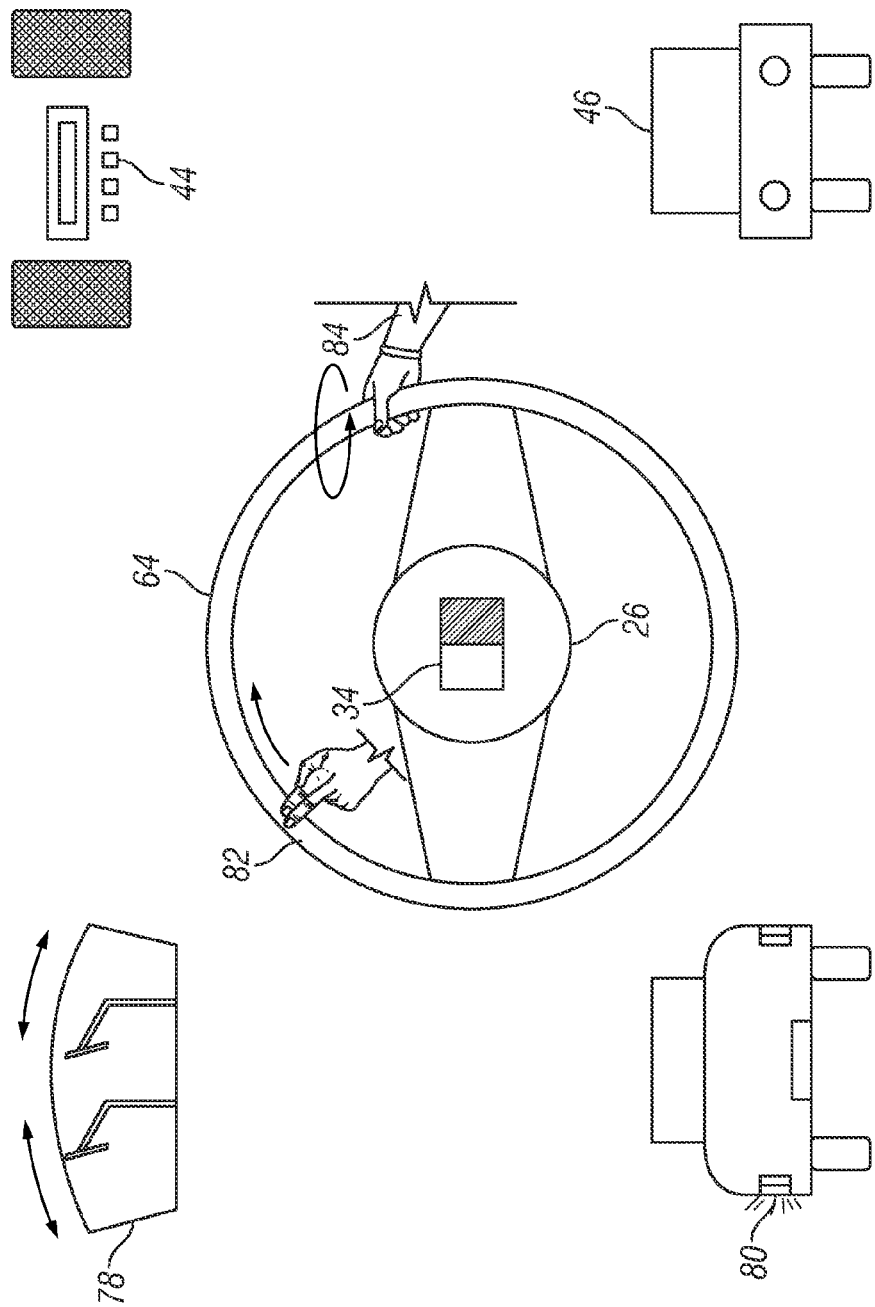

FIGS. 13-14 are schematic views illustrating the use subsystem selector switch 34 (See FIG. 1) to alternate between different operating modes to use the same gestures to actuate different vehicle subsystems. In FIG. 12, steering wheel assembly 64 is illustrated together with first subsystem 44 (stereo system), second subsystem 46 (headlight system), third subsystem 78 (windshield wiper system) and fourth subsystem 80 (turn signal system). Subsystem selector switch 34 is mounted to central hub 26 and has been actuated such that steering wheel system 20 is in the first operating mode.

As further illustrated in FIG. 13, the driver's left hand 82 makes first gesture 36 while the driver's right hand 84 makes second gesture 40. Because the steering wheel system 20 is in the first operating mode, the first and second gestures cause actuation of first subsystem 44 and second subsystem 46.

With continuing reference to FIGS. 1-14, in FIG. 14, subsystem selector switch 34 has been actuated in a manner that places steering wheel system 20 in the second operating mode. As illustrated, the driver's left hand 82 and the driver's right hand 84 again input the first and the second gestures, respectively. However, because steering wheel system 20 is in the second operating mode, these gestures no longer actuate first subsystem 44 and second subsystem 46. Rather, the first and second gestures now cause processor 30 to generate third command 86 and fourth command 88, respectively which, in turn actuate third subsystem 78 and fourth subsystem 80. In other embodiments, any number of operating modes may be possible, thus allowing only a minimal number of gestures to control a large number of vehicle subsystems.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A steering wheel system for use with a vehicle, the steering wheel system comprising:
   a steering wheel configured for attachment to a steering column of the vehicle, the steering wheel having a rim;
   a touch sensitive member associated with the rim, the touch sensitive member configured to detect a first gesture having a first movement and a first position on the rim and a second gesture having a second movement and a second position on the rim and to generate a first electronic signal when the first gesture is detected and to generate a second electronic signal when the second gesture is detected, wherein the first movement is different than the second movement and wherein the first position is the same as the second position; and
   a processor communicatively coupled to the touch sensitive member, the processor configured to be operatively coupled to a first subsystem and to a second subsystem, wherein the touch sensitive member is further configured to send the first electronic signal and the second electronic signal to the processor and wherein the processor is further configured to send a first command to the first subsystem after receiving the first electronic signal and to send a second command to the second subsystem after receiving the second electronic signal, and
   wherein the first gesture comprises wrapping a finger at least partially around the rim and twisting a hand with the finger around the rim in a direction towards or away from a driver.

2. The steering wheel system of claim 1, wherein the touch sensitive member covers a portion of the rim.

3. The steering wheel system of claim 2, wherein the portion of the rim covered by the touch sensitive member faces a driver of the vehicle.

4. The steering wheel system of claim 2, wherein the portion of the rim covered by the touch sensitive member faces away from a driver of the vehicle.

5. The steering wheel system of claim 2, wherein the touch sensitive member covers substantially an entire surface of the rim.

6. The steering wheel system of claim 1, further comprising a cover member disposed over the touch sensitive member and the rim.

7. The steering wheel system of claim 1, wherein the second gesture comprises sweeping a finger in an arc over a surface of the touch sensitive member.

8. The steering wheel system of claim 1, wherein the second gesture entails movement of two fingers substantially in unison across a surface of the touch sensitive member.

9. A steering wheel system for use with a vehicle, the steering wheel system comprising:
   a steering wheel configured for attachment to a steering column of the vehicle, the steering wheel having a rim;
   a touch sensitive member associated with the rim, the touch sensitive member configured to detect a first gesture having a first movement and a first position on the rim and a second gesture having a second movement and a second position on the rim and to generate a first electronic signal when the first gesture is detected and to generate a second electronic signal when the second gesture is detected, wherein the first movement is different than the second movement and wherein the first position is the same as the second position;
   a steering wheel sensor associated with the steering wheel, the steering wheel sensor configured to detect rotation of the steering wheel and further configured to generate a third electronic signal corresponding to the rotation of the steering wheel; and
   a processor communicatively coupled to the touch sensitive member and to the steering wheel sensor, the processor configured to be operatively coupled to a first subsystem and to a second subsystem,
   wherein the touch sensitive member is further configured to send the first electronic signal and the second electronic signal to the processor, wherein the steering wheel sensor is configured to send the third electronic signal to the processor, and wherein the processor is configured to send a first command to the first subsystem after receiving the first electronic signal when the first gesture is detected proximate a predetermined location on the rim relative to a driver of the vehicle and wherein the processor is further configured to send a second command to the second subsystem after receiving the second electronic signal when the second gesture is detected proximate the predetermined location, and
   wherein the first gesture comprises wrapping a finger at least partially around the rim and twisting a hand with the finger around the rim in a direction towards or away from a driver.

10. The steering wheel system of claim 9, wherein the third electronic signal corresponds to a deviation of the steering wheel from a neutral position.

11. The steering wheel system of claim 9, wherein the processor is configured to determine a location on the rim of the first gesture and the second gesture using the first electronic signal and the second electronic signal, respectively, and wherein the processor is further configured to determine whether the first gesture and the second gesture were made at the predetermined location by utilizing the third electronic signal.

12. The steering wheel system of claim 9, wherein the predetermined location comprises one of a left side of the rim relative to the driver and a right side of the rim relative to the driver.

13. The steering wheel system of claim 9, wherein the touch sensitive member covers a portion of the rim.

14. The steering wheel system of claim 13, wherein the portion of the rim covered by the touch sensitive member faces the driver of the vehicle.

15. The steering wheel system of claim 13, wherein the portion of the rim covered by the touch sensitive member faces away from the driver of the vehicle.

16. The steering wheel system of claim 13, wherein the touch sensitive member covers substantially an entire surface of the rim.

17. A steering wheel system for use with a vehicle, the steering wheel system comprising:
   a steering wheel configured for attachment to a steering column of the vehicle, the steering wheel having a rim;
   a touch sensitive member associated with the rim, the touch sensitive member configured to detect a first gesture having a first movement and a first position on the rim and a second gesture having a second movement and a second position on the rim and to generate a first electronic signal when the first gesture is detected and to generate a second electronic signal when the second gesture is detected, wherein the first movement is different than the second movement and wherein the first position is the same as the second position, and
   wherein the first gesture comprises wrapping a finger at least partially around the rim and twisting a hand with the finger around the rim in a direction towards or away from a driver;
   a subsystem-selector switch associated with the steering wheel; and
   a processor communicatively coupled to the touch sensitive member and the subsystem-selector switch, the processor configured to be operatively coupled to a first subsystem, to a second subsystem, to a third subsystem, and to a fourth subsystem,
   wherein the touch sensitive member is further configured to send the first electronic signal and the second electronic signal to the processor, wherein the subsystem-selector switch is configured to alternate between a first operating mode and a second operating mode, the processor being configured to control the first subsystem and the second subsystem when the subsystem-selector switch is in the first operating mode, the processor being configured to control the third subsystem and the fourth subsystem when the subsystem-selector switch is in the second operating mode, wherein the processor is further configured to send a first command to the first subsystem after receiving the first electronic signal when the subsystem-selector switch is in the first operating mode and to send a second command to the second subsystem after receiving the second electronic signal when the subsystem-selector switch is in the first operating mode, and wherein the processor is still further configured to send a third command to the third subsystem after receiving the first electronic signal when the subsystem-selector switch is in the second operating mode and to send a fourth command to the fourth subsystem after receiving the second electronic signal when the subsystem-selector switch is in the second operating mode.

18. The steering wheel system of claim 17, wherein the subsystem-selector switch is mounted to a hub of the steering wheel.

19. The steering wheel system of claim 17, wherein the subsystem-selector switch comprises a touch sensitive display screen.

* * * * *